United States Patent
Bowe et al.

(10) Patent No.: US 6,311,448 B1
(45) Date of Patent: Nov. 6, 2001

(54) PRECAST CONCRETE PLATES

(75) Inventors: Michael Damian Bowe, Newtown; Roger Shan Chung Hsin, North Wales, both of PA (US)

(73) Assignee: Rohm and Haas Company, Phila., PA (US)

(*) Notice: Subject to any disclaimer, the term of this patent is extended or adjusted under 35 U.S.C. 154(b) by 0 days.

(21) Appl. No.: 09/212,039

(22) Filed: Dec. 15, 1998

Related U.S. Application Data

(60) Provisional application No. 60/072,049, filed on Jan. 21, 1998.

(51) Int. Cl.[7] .......................................... E04C 2/04
(52) U.S. Cl. ........................... 52/596; 106/724; 106/802; 106/810
(58) Field of Search .................................... 106/638, 713, 106/724, 802, 810, 692, 695; 52/596, DIG. 7

(56) References Cited

U.S. PATENT DOCUMENTS

| | | |
|---|---|---|
| 4,229,224 | 10/1980 | Dawson et al. . |
| 4,752,520 | 6/1988 | Franklin . |
| 4,789,319 | 12/1988 | Garcia . |
| 4,986,744 | 1/1991 | Weisweiler et al. . |
| 5,017,320 | 5/1991 | Garcia . |
| 5,108,679 | 4/1992 | Rirsch et al. . |
| 5,162,060 * | 11/1992 | Bredow et al. ...................... 106/808 |
| 5,215,827 | 6/1993 | Dotzauer et al. . |
| 5,552,179 | 9/1996 | Ramun . |
| 5,580,378 | 12/1996 | Shulman . |
| 5,603,758 | 2/1997 | Schreifels, Jr. et al. . |
| 5,658,624 * | 8/1997 | Anderson et al. .................. 428/34.7 |

FOREIGN PATENT DOCUMENTS

| | | |
|---|---|---|
| 0347092 | 12/1989 | (EP) . |
| 2652848 | 10/1990 | (FR) . |
| 60155585 | 1/1984 | (JP) . |
| 62253848 | 11/1987 | (JP) . |

* cited by examiner

Primary Examiner—Michael Safavi

(57) ABSTRACT

A precast concrete plate, such as a roof tile, floor tile, wall tile or house siding, comprises in total from about 0.2% to about 5% by weight of a polymeric modifier having a Tg of above −40° C. The portion of said concrete which comprises no more than about 50% of the thickness of all the concrete which forms the plate, when measured from the bottom surface of the plate towards the top surface of the plate, includes at least about 60% by weight of said polymeric modifier. The plates have a relatively higher degree of resistance to flexural loadings and resistance to impact-impulse loadings in comparison to concrete plates which comprise no polymeric modifier, thus rendering them less likely to be broken or fractured during their storage, transfer and assembly.

13 Claims, No Drawings

PRECAST CONCRETE PLATES

This is a nonprovisional application of prior pending US provisional application serial No. 60/072,049, filed Jan. 21, 1998.

The present invention is concerned with precast concrete plates and methods for their manufacture. In particular, though not exclusively, the present invention is concerned with concrete roof tiles, floor tiles, wall tiles and house sidings, and their manufacture.

Precast concrete roof tiles are typically produced from a concrete mortar whose consistency is such that it can be molded whilst in its green state into a design having features of shape, configuration, pattern or ornament which it will retain when cured. The tiles are usually formed of a layer or layers of green concrete molded to correspond to the desired surface appearance of the tiles. The tiles may be formed of a single layer of concrete or they may be formed of multiple layers of concrete, for example as disclosed in U.S. Pat. No. 4,789,319, U.S. Pat. No. 4,986,744 and U.S. Pat. No. 5,017,320.

Precast concrete roof tiles may have dimensions in the order of 0.42 m×0.33 m×0.012 m and can weigh about 4.5 to 5 Kg per tile. Lighter concrete roof tiles of similar dimensions can be manufactured through the use of lightweight aggregates such as pumice, scoria, fly ash, and expanded shale, clay, slate, vermiculite and Perlite, for example as described in U.S. Pat. No. 5,603,758. Artificial light weight aggregates can also be used, such as polystyrene foam particles as disclosed in U.S. Pat. No. 5,580,378. Roof tiles may also be made of a fiber reinforced concrete, such as disclosed in U.S. Pat. No. 5,108,679.

Precast concrete roof tiles are susceptible to breakage or fracture during their storage, transportation and assembly to form a roof covering.

Organic polymers are often added to mortars to alter their physical and/or chemical properties. Such polymers are often referred to as cement modifiers and are usually added to the concrete, particularly light weight concretes, to improve, for example, the strength, water-resistance and open-time of the concrete. Such cement modifiers are added to a concrete mortar, in amounts of about 2% to 6% by weight, and distributed uniformly throughout the concrete mortar. A tile manufactured from such concrete demonstrates increased resistance to flexural loadings and resistance to impact-impulse loadings. However, the quantity of cement modifier required to achieve an appropriate improvement in the strength of the tile is high.

To reduce the number of tiles which may be broken during such storage, transfer and assembly, it is disclosed in U.S. Pat. No. 4,752,520 that a high degree of resistance to flexural loadings and resistance to impact-impulse loadings on the tiles can be imparted to the tile through the use of a preformed substrate member backing comprising a substantially rigid, polymeric material, such as an epoxy resin. The preformed substrate member is preferably an epoxy resin reinforced with fiberglass in a mat form, and may be molded from a sheet to the desired form. The preformed substrate member preferably has a strength equal to or greater than the strength of the concrete layer, thereby providing fracture resistance to tensile stresses on the underside of the concrete layer, and is preferably constructed to add rigidity to bending forces applied to the concrete layer. The adhesion between the reinforced fiberglass mat and the concrete layer, however, may degrade due to the effect of the alkalinity of the concrete mix and fiberglass, eventually causing delamination of the non-homogenous layers.

Accordingly, it is the object of the present invention to provide a precast concrete tile which has a relatively high degree of resistance to flexural loadings and resistance to impact-impulse loadings in comparison to conventional concrete roof tiles without using high levels of cement modifiers and which does not suffer the problems of delamination associated with the reinforced tiles of U.S. Pat. No. 4,752,520.

In accordance with the present invention, there is provided a precast concrete plate, preferably a precast concrete tile, having a top surface and a bottom surface, and length, width and depth dimensions, the plate being adapted for arrangement with other like plates to form a decorative and/or protective covering, such as a roof, floor or wall covering; with the top surface of the plate disposed to face outwardly and the bottom surface disposed to face inwardly towards an underlying support structure, such as a roof support structure, concrete floor or wall, the precast concrete plate consisting of one or more layers of concrete and optionally one or more layers of coating compositions on said top surface and/or said bottom surface, wherein the concrete comprises in total from about 0.2% to about 5%, preferably about 0.5% to about 3%, by weight of a polymeric modifier having a Tg of above −40° C., and wherein the portion of said concrete which comprises no more than about 50% of the thickness of all said concrete which forms the plate, when measured from the bottom surface of the plate towards the top surface of the plate, includes at least about 60% by weight of said polymeric modifier.

Surprisingly, we have found that comparable improvements in break strength of precast concrete plates can be achieved through the use of significantly less quantities of cement modifiers. Further, the plates do not suffer the problems associated with the reinforced tiles described in U.S. Pat. No. 4,752,520.

Preferably, the portion of the concrete which comprises no more than about 50% of the thickness of the plate, when measured from the bottom surface of the plate towards the top surface of the plate, includes at least about 75% by weight, more preferably at least about 90% by weight, and most preferably 100% by weight, of the polymeric modifier, based on the total weight of polymeric modifier in all the concrete which forms the plate.

Preferably, the major portion, if not all, of the polymeric modifier used in said concrete is included within the portion of said concrete which comprises no more than about 33% of the thickness of all said concrete which forms the plate, when measured from the bottom surface of the plate towards the top surface of the plate.

Preferably, the major portion, if not all, of the polymeric modifier used in the said concrete is included within the portion of said concrete which comprises at least about 5%, more preferably at least about 10%, of the thickness of all said concrete which forms the plate, when measured from the bottom surface of the plate towards the top surface of the plate.

In one embodiment of the present invention, the polymeric modifier used in the concrete is uniformly distributed throughout the relevant portion of said concrete. The precast concrete plate of this embodiment may be manufactured by a process which allows plates to be obtained comprised of superimposed layers of mortars of different compositions and characteristics. For example, such a process and apparatus for performing the process are described in U.S. Pat. No. 5,017,320 and U.S. Pat. No. 4,789,319, respectively. The apparatus disclosed in U.S. Pat. No. 4,986,744 may also be used for the manufacture of such multi-layered plates.

The layer of concrete which comprises the bottom surface of the plate is prepared by admixing the polymeric modifier into a conventional mortar composition to form the green concrete which, in accordance with the above process, is then extruded onto a continuous strand of moving bottom molds. Subsequently, one or more other layers of green concrete comprising substantially less or no polymeric modifier than the first formed layer are extruded onto the first layer to form the multi-layered plate. The first layer of green concrete comprises no more than about 50%, preferably no more than about 33%, of the thickness of the plate, when measured from the bottom surface towards the top surface of the plate. Preferably, the first layer of green concrete comprises at least about 5%, more preferably at least about 10%, of the thickness of the plate, when measured from the bottom surface of the plate towards the top surface of the plate. The multi-layered plate of green concrete is then cured in a conventional manner.

In another embodiment of the present invention, the polymeric modifier used in the concrete is distributed throughout the relevant portion of said concrete in such a way that the concentration of polymeric modifier is at a maximum near to the bottom surface of the plate and reduces from that point moving towards the top surface of the plate. The precast concrete plate of this embodiment may be manufactured by a process which either allows plates to be obtained comprised of a single layer of mortar, or allows plates to be obtained comprised of superimposed layers of mortars of different compositions and characteristics. Both such processes are well known in the art, examples of the former process being described in U.S. Pat. No. 5,603,758 and of the latter process being described above. In this embodiment, however, it is preferred that the polymeric modifier is not introduced into relevant portion of the concrete of the plate by admixing it with the mortar composition prior to molding. Instead, the polymeric modifier is prepared as an emulsion or solution, preferably an aqueous emulsion or solution, which is applied, for example by spraying, on to the bottom surface of the formed plate when it soaks into the concrete. The emulsion or solution is applied in such an amount that sufficient polymeric modifier penetrates into the concrete to a depth preferably of at least about 5%, more preferably at least about 10%, of the thickness of the plate, when measured from the bottom surface of the plate towards the top surface of the plate. The polymer modifier emulsion or solution does not penetrate into more than about 50%, preferably no more than about 33% of the thickness of the plate, when measured from the bottom surface of the plate towards the top surface of the plate. The polymeric modifier emulsion or solution may be applied on the bottom surface of the plate either before the green concrete has dried (wet-on-wet), after the green concrete has dried but before significant cure has occurred (wet-on-dry) or after the concrete has dried and been allowed to cure for some time. Though it is preferred that the whole of the bottom surface of the plate is treated with the polymeric modifier, it will be appreciated that the advantages of the invention are achieved once the central area of the bottom surface of the plate is treated and that treatment of the marginal areas of the bottom surface of the plate is not important in many applications. Wohen a latex emulsion is used as the polymeric modifier, it preferably comprises about 50% or less, more preferably less than about 30%, polymer solids, and the polymer particles have a particle size sufficiently small so as to enable the particles to penetrate the concrete (though some particles may be of such a size that they are not able to penetrate into the concrete and so will remain on the bottom surface of the plate to form a coating thereon. The particle size distribution of the polymer particles in the latex should be such that all or a substantial proportion of the particles, for example at least 90% by weight, can penetrate the concrete. For example, the polymer particles may have an average particle size of from about 50 nanometers to about 750 nanometers or more).

Once the precast concrete plate of the present invention has been formed, it may be coated on its top and/or bottom surfaces with appropriate coating compositions such as paints or other compositions which reduce dirt pick-up or efflorescence.

The polymeric modifier preferably has a Tg of at least about −20° C., more preferably at least 0° C. Preferably, the Tg of the polymeric modifier is no more than 70° C., more preferably no more than 45° C.

The polymeric modifier may be an organic polymer. There are many commercially available organic polymers sold as cement modifiers. Provided such polymers have a Tg of above −40° C., it is believed they will be suitable for use in the manufacture of the plates of the present invention.

Preferably the polymeric modifier is a polymer latex. The latex may be a dispersed polymer having its particles dispersed in an aqueous evaporable carrier, a water soluble polymer, a water-reducible polymer, or a mixture thereof in the aqueous evaporable carrier. The aqueous evaporable carrier is preferably water but may be water having dissolved therein a water or polymer miscible organic solvent, such as methanol, ethanol or a glycol ether.

The polymeric modifier may be a latex emulsion or powder comprising a polymer polymerized from at least one or more of the following monomers: acrylic and methacrylic acid esters such as methyl(meth)acrylate, ethyl(meth)acrylate, butyl(meth)acrylate, 2-ethylhexyl(meth)acrylate, decyl(meth)acrylate, lauryl(meth)acrylate, isobornyl(meth)acrylate, isodecyl(meth)acrylate, oleyl(meth)acrylate, palmityl(meth)acrylate, steryl(meth)acrylate, hydroxyethyl(meth)acrylate and hydroxypropyl(meth)acrylate; acid functional monomers such as acrylic acid, methacrylic acid, crotonic acid, fumaric acid and maleic acid; mono-methyl itaconate; mono-methyl fumarate; monobutyl fumarate; maleic anhydride; acrylamide or substituted acrylamides; diacetone acrylamide; glycidyl methacrylate; acetoacetoxyethylmethacrylate; acrolein and methacrolein; dicyclopentadienyl methacrylate; dimethyl meta-isopropenyl benzyl isocyanate; isocyanato ethyl methacrylate; methyl cellulose; hydroxyethyl cellulose; styrene or substituted styrenes; butadiene; ethylene; vinyl acetate or other vinyl esters; vinyl monomers such as vinyl chloride, vinylidene chloride, N-vinyl pyrrolidone; amino monomers such as N,N'-dimethylamino(meth)acrylate and acrylonitrile or methacrylonitrile. Most preferably, the latex comprises an acrylic polymer, a styrene/acrylic polymer, a styrene/butadiene polymer, a vinyl acetate/ethylene polymer, or polyvinyl acetate, or mixtures thereof. Other suitable polymers and specific examples of commercially available polymers are disclosed in U.S. Pat. No. 4,229,224. Example of commercially available cement modifiers suitable for use in the manufacture of plates of the present invention include DOW 460 available from Dow Chemical Company, RHOPLEX E-330 available from Rohm and Haas Company, UCAR Latex 417 and Latex 429 available from Union Carbide Corp). The latex is generally stabilised by an anionic, cationic or nonionic surfactant in a conventional manner, though the use of a surfactant may also require the use of a defoamer for mixing in the concrete.

The polymeric modifier may be an inorganic polymer, such as sodium silicate or sodium aluminate. In this embodiment, sodium silicate is the preferred polymeric modifier.

It will be appreciated that the polymeric modifier may be derived from a monomer mix which is polymerized after the monomers have been incorporated into the concrete by, for example, either of the above two methods. Examples of such monomers include organic monomers such as epoxy monomers and isocyanate monomers; and inorganic monomers such as tetraethyl orthosilicate.

The polymeric modifier may be a blend of an organic and inorganic polymer, such as a blend of any of the above organic and inorganic polymers.

It is preferred that the polymeric modifier be incorporated into the concrete plate before the bottom surface of the plate is coated with a coating composition, should it be desired to do so.

The invention shall now be further described with reference to the

EXAMPLES

A lightweight concrete A was made according to the following formulation, as disclosed in Table 2 of U.S. Pat. No. 5,603,758:

Concrete A

| Ingredients | % by Wt |
| --- | --- |
| Cement Modifier* | 2.4(solids) |
| Cement | 24.4 |
| Lightweight Aggregate | 41.5 |
| Water | 10.9 |
| Standard Weight Aggregate | 15.3 |
| Limestone | 4.9 |
| CaCl2 | 0.6 |
| Total | 100.0 |

*an acrylic latex having a Tg of 25° C., an average particle size of 180 nm, stabilized by 2% by wt solids on polymer solids of an ethoxylated alkylphenol, a nonionic surfactant.

Cement, lightweight aggregate, standard weight aggregate and limestone were mixed together as a dry mix. Cement modifier and the majority of the water were added to the dry mix followed by 90 seconds of mixing. CaCl2 (as an aqueous concentrate) was then added and mixing continued for 60 seconds. Nopco NXZ (available from Henkel Corp.) defoamer (0.05% by wt on total batch) was than added followed by a further 60 seconds of mixing. The modifier and other components were thus uniformly distributed throughout the concrete A lightweight concrete B, having the same formulation as lightweight cement A except that the commercial cement modifier and defoamer were omitted, was prepared according to the above process.

Single-layer flexural test plates were made by evenly distributing 62 g of the green concretes A and B into a 0.127 m×0.019 m rectangular mold. Two-layer flexural test plates were made by evenly spreading some of green concrete A into a mold, then enough of green concrete B on top of this to give a total green concrete weight of 62 g. The concrete was then compressed in the molds with a plunger in a hydraulic press, such that pressure raised to 13.8 MPa (2000 psi) over 5 to 10 seconds. The plates were cured at 50° C. and 100% relative humidity for 4 hours, then at 50° C. and ambient relative humidity for 1 hour, and then for a further 2 weeks on a bench top. The cured plates were 13mm thick and weighed 56 to 58 g.

The plates were then tested in a 3 point flex (ASTM D 790–86): span 0 m, crosshead speed =2.75 mm/min. Four plates of each treatment were tested, and the average flexural strength calculated. The results are shown in

TABLE A

| Example | Concrete Mix | Flex strength (MPa) | % by wt Polymeric Modifier |
| --- | --- | --- | --- |
| 1a | B | 4.3 | 0 |
| 1b | B | 3.7 | 0 |
| 1c | B | 3.9 | 0 |
| 2a | A | 7.0 | 2.6 |
| 2b | A | 7.7 | 2.6 |
| 3a | 50% A/50% B | 7.1 | 1.3 |

Compared to the plates in Example 1 (zero polymeric modifier), the plates of Examples 2 and 3 demonstrate a significant and similar increase in break strength. The plate in Example 3, however, achieves the increase in break strength using only half the polymeric modifier used in the plates of Example 2.

Concrete B was also used to make single-layer plates which were prepared as above. The plates were then treated with aqueous polymeric modifier (Examples 7 to 9 with the above cement modifier and Example 10 with 25% sodium silicate solution). In each case, 2 g of the aqueous polymeric modifier was applied to the bottom surface of the plate. The aqueous modifier penetrated the plate within 30 seconds. Application of the modifier was effected as follows: Example 7—immediately after plate molding (wet-on-wet), Example 8—immediately after removal from the 50° C. oven (wet-on-dry), and Example 9—after day 13 of cure and permitting a further day for the aqueous polymeric modifier composition to dry. In each of the above three examples, the polymeric modifier penetrated to at least 5% but no more than 33% of the thickness of the plate, the concentration of modifier being at a maximum near to the bottom surface of the plate and reducing towards the top plate The plates were then tested as above. The results are shown in Table B Each of Example 6 to 10 demonstrate a significant increase in break strength over the plate with no polymeric modifier. Examples 7 to 9 achieve this through the use of much less polymeric modifier than in Example 6.

TABLE B

| | Concrete | Flex | Polymeric Modifier | |
| --- | --- | --- | --- | --- |
| Example | Mix | Strength (MPa) | % solids as applied | % by wt |
| 5 | B | 4.0 | 0 | 0 |
| 6 | A | 7.3 | 0 | 2.6 |
| 7 | B | 6.4 | 50 | 1.7 |
| 8 | B | 6.9 | 25 | 0.9 |
| 9 | B | 6.1 | 25 | 0.9 |
| 10 | B | 7.0 | soln | 0.9 |

What is claimed is:

1. precast plate, having a top surface and a bottom surface, the plate being adapted for arrangement with other like plates to form a decorative and/or protective covering with the top surface of the plate disposed to face outwardly and the bottom surface disposed to face inwardly towards an underlying support, said plate comprising at least one layer of a concrete composition, said composition comprising a polymeric modifier, at a concentration of about 0.2% to about 5% by weight of the concrete composition, having a Tg of above −40° C., wherein at least 60% by weight of said modifier is distributed in no more than about 50% of the thickness of said plate, when measured from the bottom surface of said plate towards the top surface of said plate.

2. The precast plate as claimed in claim 1, wherein the plate is a roof tile, floor tile, or wall tile.

3. The precast plate, as claimed in claim 1, wherein said plate is coated on said top surface and said bottom surface, with at least one layer of a coating composition.

4. The precast plate as claimed in claim 1, wherein said plate is coated on at least one surface of said plate, with at least one layer of a coating composition.

5. The precast plate as claimed in claim 1, wherein at least 75% by weight of said modifier is distributed in no more than about 50% of the thickness of said plate, when measured from the bottom surface of said plate towards the top surface of said plate.

6. The precast plate as claimed in claim 5,
wherein the polymeric modifier used in the concrete composition is uniformly distributed throughout no more than about 50% of the thickness of said plate, when measured from the bottom surface of said plate towards the top surface of said plate.

7. The precast plate as claimed in claim 1, wherein at least 90% by weight of said modifier is distributed in no more than about 50% of the thickness of said plate, when measured from the bottom surface of said plate towards the top surface of said plate.

8. The precast plate as claimed in claim 1,
wherein the polymeric modifier used in the concrete composition is distributed throughout the portion of the concrete plate of no more than about 10% of the thickness of said plate, when measured from the bottom surface of 'said plate towards the top surface of said plate,
wherein the concentration of said polymeric modifier is at a maximum near to the bottom surface of the plate, and reduces from that point moving towards the top surface of the plate.

9. The precast plate as claimed in claim 1, wherein at least 100% by weight of said modifier is distributed in no more than about 50% of the thickness of said plate, when measured from the bottom surface of said plate towards the top surface of said plate.

10. The precast plate as claimed in claim 1, wherein at least the major portion of said modifier is distributed in no more than about 33% of the thickness of said plate, when measured from the bottom surface of said plate towards the top surface of said plate.

11. The precast plate as claimed in claim 1, wherein the major portion of said modifier is distributed in no more than about 10% of the thickness of said plate, when measured from the bottom surface of said plate towards the top surface of said plate.

12. The precast plate as claimed in claims 1, wherein the major portion of said modifier is distributed in no more than about 5% of the thickness of said plate, when measured from the bottom surface of said plate towards the top surface of said plate.

13. The precast plate as claimed in claim 12,
wherein the polymeric modifier used in the concrete composition is distributed throughout the portion of the concrete plate of no more than about 5% of the thickness of said plate, when measured from the bottom surface of said plate towards the top surface of said plate,
wherein the concentration of said polymeric modifier is at a maximum near to the bottom surface of the plate and reduces from that point moving towards the top surface of the plate.

\* \* \* \* \*